United States Patent
Sukhna et al.

(10) Patent No.: US 6,224,284 B1
(45) Date of Patent: May 1, 2001

(54) METALLIC INK COMPOSITION FOR WICK TYPE WRITING INSTRUMENTS

(75) Inventors: Chhman Sukhna; Charles Reichmann, both of Queens, NY (US)

(73) Assignee: Dri Mark Products Incorporated, Port Washington, NY (US)

( * ) Notice: Subject to any disclaimer, the term of this patent is extended or adjusted under 35 U.S.C. 154(b) by 0 days.

(21) Appl. No.: 09/416,359

(22) Filed: Oct. 12, 1999

(51) Int. Cl.[7] .................................................... B43K 5/00
(52) U.S. Cl. ..................... 401/198; 401/196; 106/31.6; 106/31.65
(58) Field of Search ................................. 401/198, 196, 401/199; 106/31.6, 31.65, 403, 404

(56) References Cited

U.S. PATENT DOCUMENTS

| | | |
|---|---|---|
| 4,065,215 | * 12/1977 | Otsuka ................................. 401/199 |
| 4,082,467 | * 4/1978 | Kaplan ................................. 401/199 |
| 4,269,526 | * 5/1981 | Dupre ................................. 401/198 |
| 4,545,819 | 10/1985 | Shioi et al. . |
| 4,657,591 | 4/1987 | Shioi et al. . |
| 5,474,603 | 12/1995 | Miyashita et al. . |
| 5,494,512 | 2/1996 | Yamamoto et al. . |
| 5,762,694 | 6/1998 | Yokoi et al. . |
| 5,931,996 | 8/1999 | Reisser et al. . |

FOREIGN PATENT DOCUMENTS

| | | |
|---|---|---|
| 129618 | 6/1988 | (JP) . |
| 63-72771 | 7/1988 | (JP) . |
| 9312175 | 6/1993 | (WO) . |

* cited by examiner

Primary Examiner—David J. Walczak
(74) Attorney, Agent, or Firm—Ostrolenk, Faber, Gerb & Soffen

(57) ABSTRACT

An ink composition or system for writing instruments constructed with a polyester fiber reservoir and a porous oriented fiber nib. This ink system will write on both black and white surfaces. On black surfaces, it will reveal itself as being opaque and metallic almost iridescent in appearance. On white surfaces, a tint of color is observed with distinct flecks of silver. The ink system is composted of water as a carrier, a permanent water-based binder, a colored pigmented permanent water-based dispersion of sub-micron particle size, a unique aluminum dispersion of specific particle size in a special carrier, a humectant, a surfactant that lowers surface tension, an anti-settling additive, a preservative and a base acting as a pH adjuster.

21 Claims, 2 Drawing Sheets

STANDARD MARKER CONSTRUCTION

METALLIC INK COMPOSITION FOR WICK TYPE WRITING INSTRUMENTS

BACKGROUND OF THE INVENTION

The present invention relates to metallic ink based writing instruments and, more particularly, to metallic ink compositions for wick type writing instruments.

Currently, metallic ink writing instruments are enjoying great popularity. These are almost entirely in the form of a conventional style marker currently called a valve action marker (see FIG. 1). From the diagram, one can see that this is a complex device involving elaborate assembly. The valve action marker also involves shaking back and forth and then depressing, or pumping, the nib several times before ink will come down. As one can see, this is a rather cumbersome process.

Historically, metallic pigments have a large particle size greater than 20 microns; therefore, passage through a wick-style marker has not been possible. Instead, a valve-action marker is constructed with two steel balls in its ink chamber and a spring mechanism at the front in contact with the nib or tip. Since the specific gravity of the aluminum pigment is greater than water, it tends to settle rapidly. This is overcome by shaking back and forth, thereby re-mixing the aluminum particles in the ink. The pumping action on the paper forces the large particle aluminum pigments through the tip by applying pressure through the tip, thereby, producing ink and making writing possible.

Related conventional art includes U.S. Pat. Nos. 5,013,543 to Mercado; 5,219,560 to Kazuhiro; 5,106,881 to Hiroshi; 4,761,277 to Valdes; 4,872,905 to Bourne and 4,604,139 to Shoi, the contents of which are incorporated by reference herein. Regardless, the prior art has not delivered to date a wick-style marker which can deliver metallic pigments, i.e. inks, in writing instruments. As a result, metallic ink writing instruments have been more expensive, more complex to build and maintain, less reliable and have not fully realized their potential.

SUMMARY OF THE INVENTION

The general object of the present invention is to provide metallic ink compositions that work reliably in wick type writing instruments.

The foregoing and other objects of the invention are realized by the present invention which shows how one can overcome the aforementioned drawbacks of the prior art using a comparatively inexpensive wick-style marker that works by capillary action eliminating a costly assembly process.

The objects of the invention are achieved by mainly utilizing:

1. A small particle size aluminum dispersion less than 12 microns;
2. an anti-settling agent to keep aluminum flakes in suspension;
3. a densely packed highly porous polyester fiber filler;
4. a highly porous oriented polyester fiber nib with many channels;
5. a non-volatile humectant; and
6. a sub-micron colored pigmented dispersion.

This invention will work for a conventional simple wick-style marker that carries a cylindrical shaped reservoir (filler) that absorbs the ink and transports it to a porous oriented fiber nib that feeds on the filler by capillary action (see FIG. 2).

The invention results in a minimum of metallic particles settling out. The marker can be stored either vertically or horizontally; overcoming a traditional problem associated with pigmented ink systems. This wick-ink system, when filled into the writing device (FIG. 2), will also lay-down a thick opaque line capable of being seen on both black and white surfaces.

Traditional inks that work with pens (FIG. 2) cannot write on black paper since they are translucent, therefore, this market has been occupied by the valve-action marker of FIG. 1 which permits the flow of large particle size pigments. This invention solves this problem in a wick-style writing instrument (FIG. 2) that is user friendly and much simpler, not to mention a cheaper alternative.

The present invention is based on the startling discovery that based on the disclosed, specific ink formulation, a writing instrument can be made that carries a cylindrical shaped reservoir which feeds into a fiber nib by capillary action and remains for extended periods without settling out or blocking the nib or tip. This invention also eliminates the use of an expensive valve type marker.

Thus, an object of the invention is that a single wick-type pen can be used to write on both black and white surfaces and achieve a metallic almost iridescent appearance.

Another object of the invention is a pen that may possibly be used for decorative poster work on both black and white surfaces.

A further object of the invention is the ability to write on human skin to achieve decorative effects similar to temporary tattoos, with an intense opaque metallic look, and washable with soap and water.

Still further, an object of this invention is to attain, by changing the permanent binder to a temporary one, a damp erase or dry erase writing instrument that can be made to write on black and white melamine, porcelain and all non porous boards.

The invention composition includes water as a carrier, an acrylic resin in solution as a binder although a polyvinylpyrrolidone polymer can be substituted to make temporary inks, a pigmented dispersion as a coloring agent, a unique aluminum dispersion of particle size 1 to 12 microns, a surfactant to reduce surface tension, an anti-settling agent to suspend aluminum particles along with a preservative, and a pH adjuster in the form of an amine.

The components of the writing instrument utilized in this invention are of some importance. The polyester filler, or reservoir chosen, must be densely packed and porous to allow flow of aluminum particles and at the same time keep settling to a minimum. Polyester fiber is chosen because it is non-reactive and very porous. The tip, or nib, of the writing instrument must be a porous, oriented polyester nib that has many channels to allow aluminum pigments to pass freely. Many other types of fibers will filter the aluminum and only allow the colored pigment to pass through, thus creating a non-metallic appearance.

One additional detail should be noted about this invention. Dyes are not used in this composition. This is because dyes wash away easily, they do not provide bonding to the aluminum pigments and are more of an outline as described in U.S. Pat. No. 4,604,139.

This invention utilizes a permanent and semi-permanent opaque metallic ink, which may display iridescent qualities depending on the surface written on—black or white.

Other features and advantages of the present invention will become apparent from the following description of the invention which refers to the accompanying drawings.

DETAILED DESCRIPTION OF THE INVENTION

Figure 1:
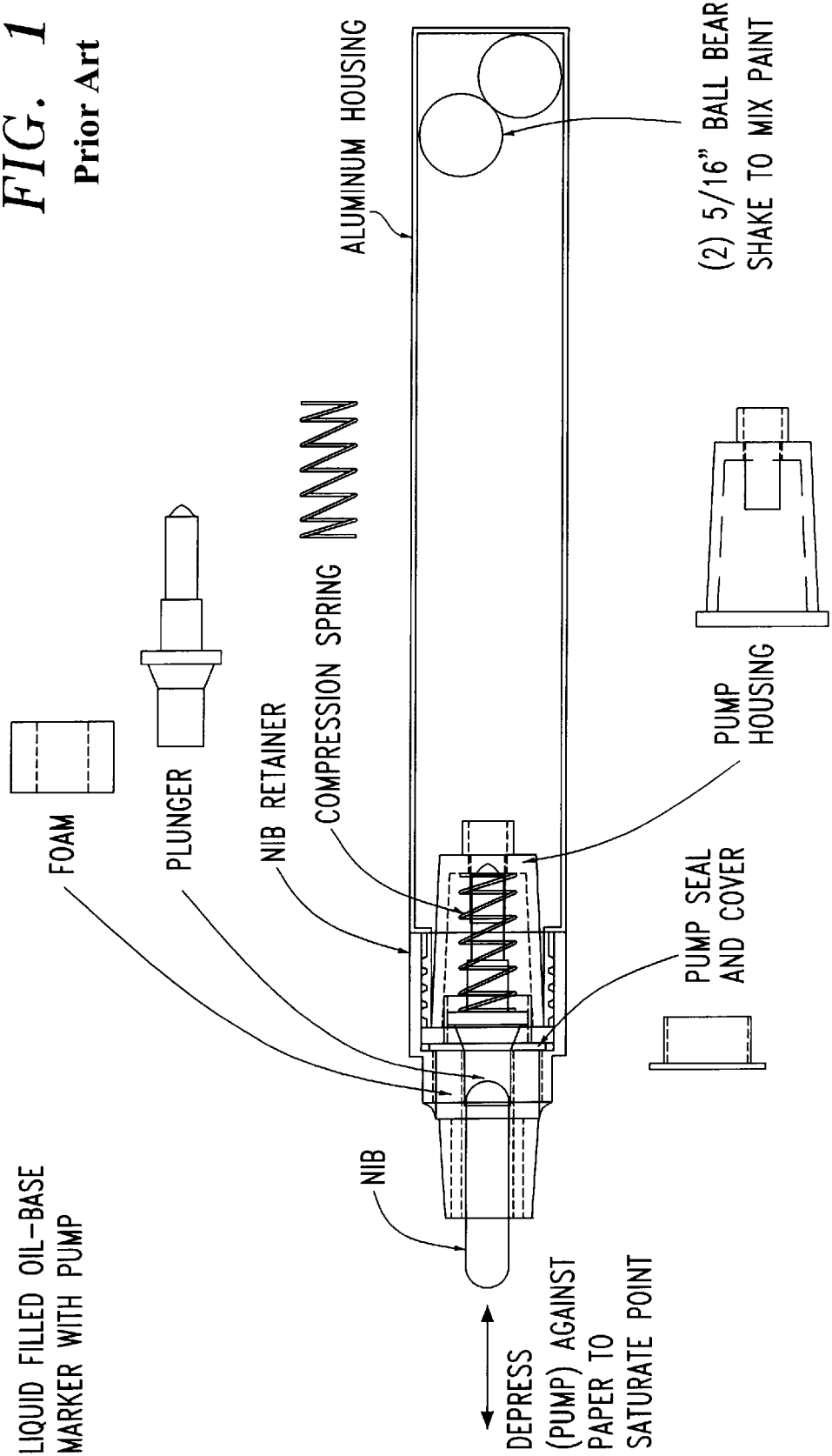
FIG. 1 diagrammatically illustrates a conventional valve action ink dispensing writing implement.

The present invention illustrates the considerable ease and convenience of an ink system in a simple wick type writing instrument (FIG. 2), compared to the complexity of conventional valve-action markers (FIG. 1) that are currently used to deliver metallic inks.

This invention is accomplished by providing an aqueous one-phase ink composition having a viscosity of 5 cps to 10 cps at 25° C. with a pH of 7.5 to 8.5 suitable for use in a wick-style writing instrument with a porous oriented fiber nib.

This ink system contains an aluminum pigmented dispersion of no greater particle size than about 12 microns, a sub-micron pigmented colored aqueous dispersion to impart a tint and contribute to permanency, an anti-settling agent to keep aluminum particles from settling out, and a binder to bind the aluminum pigments together and to impart adhesion, water resistance, gloss, and permanency to different surfaces.

In addition to the foregoing important ingredients, this ink system may contain other additives including a preservative, a surfactant to reduce surface tension, a pH adjuster in the form of an amine, and a rheology modifier such as a starch or clay.

As noted before, one of the important aspects of the present invention is the particle size of the aluminum pigments. If the particle size is too large, greater than 12 microns, they will not flow through the pathways of the filler and nib. This is one of the main reasons why metallic inks have been confined to be used only in valve markers (FIG. 1), which is essentially a free-flowing system, and the pumping action imparts pressure on the aluminum particles forcing them through the nib.

The present invention solves the problem by using a carefully monitored particle size aluminum dispersion, along with a customized filler of high density with many pathways, and a highly porous oriented fiber nib with many channels.

The aluminum flakes are dispersed initially in water and binder of starch with the pH adjusted anywhere between 7.0 and 8.0. This prevents the build up of hydrogen gas, which is a notorious and dangerous problem associated with aluminum pigments. The finished ink system is adjusted to a pH of 7.5 to 8.5; this is to ensure this problem does not occur.

The dispersion used in the present invention is of the type Stapa Hydrolac AW from Eckart and Roto Vario from Eckart. The amount needed to impart a metallic look varies from about 10% to 25% by weight depending upon the desired intensity of the color.

It is very interesting to note that on black surfaces, the pigmented color and the aluminum pigments bond together to impart a uniform metallic line. On white paper, the color is separated from the metallic flakes showing a line that is tinted in color and flecked with aluminum to impart a silver appearance.

The aluminum dispersions of the present invention are very stable at temperatures of 100° F. to 125° F. and do not dry up easily. This contributes to the long shelf life of the marker. For this ink system to be stable, the starch which bonds the aluminum flakes in the dispersion have even more cohesion with the marker binder of the system thereby contributing to it staying in solution and keeping the aluminum flakes suspended.

The binder in the present invention is an acrylic resin solution of about 40% to 50% solids. This binder forms a clear film at room temperature on drying. It is resistant to water and adheres well to most surfaces. The pH is between 7.5 and 8.5. The viscosity is 100 to 150 cps and the glass transition temperature t.g. °C.30. The binder must be able to form a film at room temperature. This is the only way the aluminum flakes will bond to writing surfaces on drying. Typical resins of this type include GA-1590 from B.F. Goodrich and Joncryl 537 from S.C. Johnson.

Many other polymers will come to mind of those skilled in the art. The binder is used at about 10% to 25% by weight depending on the desired resistance properties.

The pigmented colored dispersion is of great importance since this dispersion imparts the desired color to the overall metallic ink system and makes it pleasing to the eye. The present invention utilizes a dispersion of about 35% to 45% solids, pH 8.0 to 9.0, and viscosity of 100 to 150 cps at 25° C. The pigments are grounded in an acrylic binder or surfactant to a particle size less than 0.5 micron enhancing their bonding ability to the aluminum pigments. Common dispersions used in the invention include Heucosperse colors from Heucotech and Acroverse colors from Penn Color. A percentage of 10% to 20% by weight is used depending on the desired color intensity.

The anti-settling agent additive is of particular importance because of the aluminum flakes readiness to settle out. The ionicly charged sites on the additive bond themselves to the aluminum flakes suspending them in solutions for extended periods and keeping them tightly adhered to the surfaces of the colored pigments. This ensures that the ink traveling down the polyester filler into the nib and onto the writing surfaces is metallized. Without the anti-settling agent, the aluminum flakes would separate very quickly from the colored pigments. The resulting system will be one that writes very non-uniform by, with colored lines appearing with no metallic appearance. The anti-settling agent utilized in this invention is ionic in nature and derived from a polycarboxylic acid. Examples are phtalic acid, adipic acid and tri-metallic acid. A percentage of 0.25% to 1.5% by weight is utilized, an example of this agent is BYK105 from Byk Chemie.

A humectant is utilized in this invention to keep the finished writing instrument from drying out on extended storage in warm and humid conditions. Polyglycols are particularly adept in these applications, although glycerin may be utilized. This invention uses Polyglycols of molecular weight of 400 to 725 at about 5% to 10% by weight. Examples are Carbowax 400 and Carbowax 700 distributed by Pride Chemicals.

With many water based ink systems the surface tension is very high. A surfactant helps reduce this property so that proper flow through the filler and wetting on different surfaces are achieved. This ink composition has a surface tension of about 37 to 40 dynes/cm and utilizes a fluro chemical surfactant similar to one provided by 3M FC-170C and zonyl FSN supplied by DuPont Chemicals. A percentage of 0.5% to 0.75% by weight is used in this invention.

To discourage improper use of the marker, a water-soluble organic solvent such as denatured ethanol is utilized in this invention. This also contributes to its drying speed on different surfaces. An example would be SOF-642 distributed by Pride Chemicals. A quantity of 3% to 10% is utilized.

As mentioned before, the ink system needs to be maintained at a pH of 7.0 to 8.5 so as to avoid the build up of hydrogen gas. Therefore, an amine pre-mixed with water to avoid shocking the aluminum flakes is utilized to adjust and stabilize the pH. This invention uses Triethanolamine (99%) at about 0.25% to 1.0% by weight, distributed from Pride Chemicals. Other common amines such as AMP-95 distributed by Angus Chemicals can also be used.

Finally, a preservative is utilized to keep fungi and bacteria from build up in the writing instrument on extended storage. A number of preservatives will come to mind of one skilled in the art. The preferred product in this invention is Germaben II from ISP Polymers used at 1.0% to 3.0% by weight.

Figure 2:
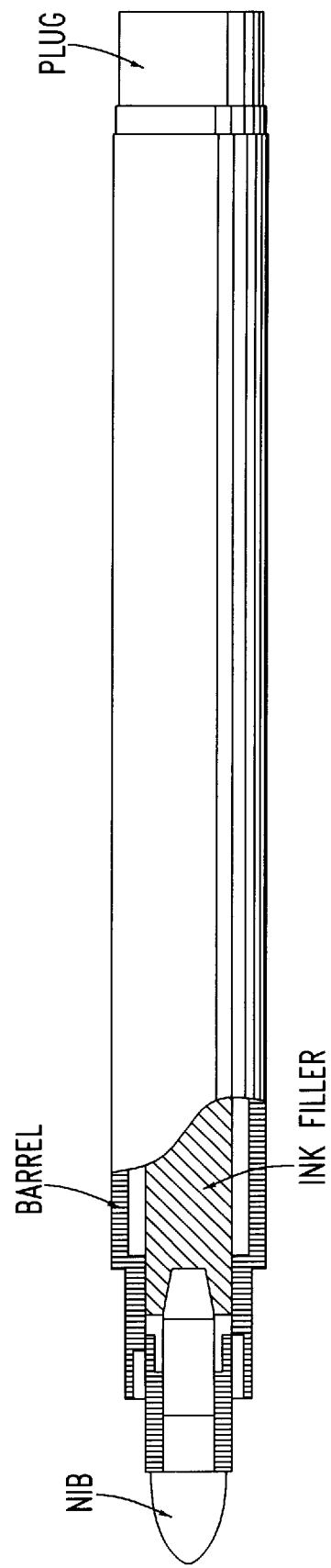
FIG. 2 illustrates a conventional, wick-style writing implement.

The following examples will demonstrate this ink system that utilizes a simple wick-style marker (FIG. 2).

All figures are percentage by weight.

Red Permanent Metallic Ink

|  |  |  |
|---|---|---|
|  | Distilled Water | 57.00 |
| B.F. Goodrich | GA1594 | 10.00 |
| Pride Chemical | Carbowax 400 | 5.00 |
| Eckart | Stapa Hydolac AW | 15.00 |
| Penn Color | Acroverse Red 5123 | 10.50 |
| ISP Polymers | Germaben II | 1.25 |
| Pride Chemical | Triethylanolamine 99% | 0.25 |
| Byk Chemie | Byk 105 | 1.00 |
|  |  | 100.00 |

Blue Permanent Metallic Ink

|  |  |  |
|---|---|---|
|  | Distilled Water | 42.25 |
| B.F. Goodrich | GA1594 | 10.00 |
| Pride Chemical | Carbowax 400 | 5.00 |
| Eckart | Roto Vario RV5000 | 25.00 |
| Heuback | HeucosperseBS5525 | 15.00 |
| ISP Polymers | Germaben II | 1.25 |
| Pride Chemical | Triethylanolamine 99% | 0.50 |
| Byk Chemie | Byk 105 | 1.00 |
|  |  | 100.00 |

Green Permanent Metallic Ink

|  |  |  |
|---|---|---|
|  | Distilled Water | 50.25 |
| S.C. Johnson | Joncryl 537 | 11.00 |
| Pride Chemical | Carbowax 400 | 4.00 |
| Eckart | Roto Vario RV5008 | 20.00 |
| Penn Color | Acroverse Green 32G120 | 12.00 |
| ISP Polymers | Germaben II | 1.25 |
| Angus Chemical | AMP-95 | 0.25 |
| Byk Chemie | Byk 105 | 1.25 |
|  |  | 100.00 |

Gold Permanent Metallic Ink

|  |  |  |
|---|---|---|
|  | Distilled Water | 44.50 |
| S.C. Johnson | Joncryl 537 | 10.00 |
| Pride Chemical | Carbowax 400 | 7.00 |
| Heubach | Heucosperse III YS5345 | 15.00 |
| Eckart | Roto Vario RV5008 | 20.00 |
| ISP Polymers | Germaben II | 2.00 |
| Angus Chemical | AMP-95 | 0.25 |
| Byk Chemie | Byk 105 | 1.25 |
|  |  | 100.00 |

Semi-Permanent Wet Erase Metallic Ink For Black and White Melamine, Porcelain and All Non Porous Boards

Blue Ink Wet Erase Metallic

|  |  |  |
|---|---|---|
|  | Distilled Water | 63.75 |
| Pride Chemical | Carbowax 400 | 7.00 |
| ISP Technologies | PVP/VA630 | 2.00 |
| Heubach | Heucosperse 33S5528 | 10.00 |
| Eckhart | Roto Vario RV5008 | 15.00 |
| ISP Technologies | Germaben II | 1.00 |
| Angus Chemical | AMP-95 | 0.25 |
| Byk Chemie | Byk 105 | 1.00 |
|  |  | 100.00 |

Red Ink Wet Erase Metallic

|  |  |  |
|---|---|---|
|  | Distilled Water | 67.75 |
| Pride Chemical | Carbowax 400 | 4.00 |
| Penn Color | Heucosperse Red 5123 | 15.00 |
| ISP Technologies | Germaben II | 1.00 |
| Eckart | Roto Vario RV5308 | 10.00 |
| Pride Chemical | Triethanolamine 99% | 0.50 |
| Byk Chemie | Byk 105 | 0.75 |
| ISP | PVP/VA 670 | 1.00 |
|  |  | 100.00 |

Summarizing, the present invention comprises a metallizing system for writing instruments having a densely packed polyester fiber reservoir and a porous polyester oriented fiber nib with channels allowing passage of specific particle size aluminum pigment (less than 12 microns). This nib is in contact with the reservoir shown in the writing instrument illustrated in FIG. 2 and the system functions by capillary action.

As described, the ink system includes: distilled water as a carrier, at about 40% to 70% by weight; a water soluble organic solvent having an evaporation rate greater than 1.0 at 25° C. using butyl acetate at about 1.0 as a basic; a liquid acrylic resin solution at about a 40% to 50% solids and present in the ink system from about 10% to 20% by weight; said humectant being selected from a group of polyglycol molecular weight 400 to 1025 and present in the ink system from about 5% to 15% by weight; an aluminum pigmented dispersion of about 10% to 15% solids at less than about 12 microns particle size and present at 10% to 25% by weight with a pH of about 7.0 to 8.5; a fluro chemical surfactant with a pH of about 9.0 and surface tension of about 25 dynes/cm and present at 0.25% to 1.0% by weight; an anti-settling agent chosen from a lower molecular weight unsaturated polycarboxylic acid that has an ionic charge present in an amount 0.25% to 1.25% by weight; and an ammoniacal base for adjusting the pH of the ink system to about pH 7.5 to 8.5 present in an amount 0.25% to 1.5% by weight; and a colored water-based pigmented dispersion of about 35% to 45% solids having a particle size less than about 0.5 microns and present in amount 10% to 20% by weight.

The ink system also includes a binder than is an acrylic resin solution present at about 10% to 25% by weight selected from a group or class of acrylic resin solutions that have a t.g. °C. −16 to 30, MFFT °C.<25° C., a viscosity of about 50 cps to 150 cps, and a solid content of about 40% to 50%.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A writing instrument, comprising:
a densely packed polyester fiber reservoir and a porous polyester oriented fiber nib with channels allowing passage of an ink therethrough;
an ink system in the reservoir, the ink system including a color pigmented dispersion and a metallic dispersion pigment of a particle size that is not greater than about 12 microns;
an anti-settling agent to keep the particles of the metallic dispersion in suspension; and
the fiber nib being in contact with the reservoir and being able to absorb the metallic dispersion by capillary action without a valve-action mechanism.

2. The writing instrument of claim 1, including;
a nonvolatile humectant; and
said color pigmented dispersion having a sub-micron particle size.

3. The writing instrument of claim 2, wherein said ink system includes:
distilled water as a carrier, at about 40% to 70% by weight;
a water soluble organic solvent having an evaporation rate greater than 1.0 at 25° C. using butyl acetate at about 1.0 as a basic; a liquid acrylic resin solution at about a 40% to 50% solids and present in the ink system from about 10% to 20% by weight;
said humectant being selected from a group of polyglycol molecular weight 400 to 1025 and present in the ink system from about 5% to 15% by weight;
an aluminum pigmented dispersion of about 10% to 15% solids at less than about 12 microns particle size and present at 10% to 25% by weight with a pH of about 7.0 to 8.5;
a fluro chemical surfactant with a pH of about 9.0 and surface tension of about 25 dynes/cm and present at 0.25% to 1.0% by weight;
an anti-settling agent chosen from a lower molecular weight unsaturated polycarboxylic acid that has an ionic charge present in an amount 0.25% to 1.25% by weight; and an ammoniacal base for adjusting the pH of the ink system to about pH 7.5 to 8.5 present in an amount 0.25% to 1.5% by weight; and
a colored water-based pigmented dispersion of about 35% to 45% solids having a particle size less than about 0.5 microns and present in amount 10% to 20% by weight.

4. The writing instrument of claim 3, wherein this said ink system is stable in a slightly alkaline medium and non-reactive with hydrogen gas, and said surfactant is capable of reducing surface tension and promote flow.

5. The writing instrument of claim 2, wherein said ink system has one phase with a viscosity of 5 cps to 10 cps, a pH of about 8.0 to 8.5, and a surface tension of about 37 dynes/cm, which lays down a smooth unbroken opaque metallic line.

6. The writing instrument of claim 2, wherein this said ink system includes a binder that is an acrylic resin solution present at about 10% to 25% by weight selected from a group or class of acrylic resin solutions that have a t.g. °C. −16 to 30, MFFT°C.<25° C., a viscosity of about 50 cps to 150 cps, and a solid content of 40% to 50%.

7. The writing instrument of in claim 5, wherein said binder forms a clear film at room temperature and remains stable at temperatures 100° F. to 125° F. for extended periods to allow for a longer shelf life of the ink system.

8. The writing instrument of claim 2, including a binder comprising a polyvinylpyrrolidone polymer at about 1% to 2% by weight, so as to complete a semi-permanent wet erase and/or dry erase metallic ink system capable of writing on black and white melamine, porcelain and all non porous boards.

9. The writing instrument of claim 2, wherein this ink system comprises an aluminum-pigmented water-based dispersion whose particle size is no greater than 12 microns made from bright leafing aluminum flakes.

10. The writing instrument of claim 9, wherein said aluminum is dispersed in a medium of starch and water to prevent settling and a pH of 8.0 and 8.5 to prevent hydrogen gas build up and is stable at 100° F. to 125° F. so as to prevent drying out of the writing instrument.

11. The writing instrument of claim 2, wherein said ink system includes, as a an anti-settling additive based on a lower molecular weight, unsaturated polycarboxylic acid with ionic activity that will bond with aluminum pigments and keep them in suspension for extended periods in a low viscosity ink system.

12. The writing instrument of claim 2, wherein this said anti-settling additive increases color strength and prevents hard settling of aluminum pigments.

13. The writing instrument of claim 2, wherein this said ink system utilizes a humectant chosen from a group of polyglycol of molecular weight 400 to 1025.

14. The writing instrument of claim 2, wherein this said ink system, includes a preservative to prevent build up of fungi and bacteria in water-based inks containing diazolidinyl urea, methyl paraben, and propyl paraben.

15. The writing instrument of claim 2, wherein this said ink system includes a pH adjuster in the form of a base capable of stabilizing said system to a pH of 8.0 to 8.5.

16. The writing instrument of claim 2, including a polyester fiber reservoir that is tightly bonded in a wrapped polypropylene skin in contact with a multi-channel highly porous oriented fiber nib containing said ink system, said ink system having a viscosity of 5 cps to 10 cps at 25° C., a surface tension of less than 40 dynes/cm at 25° C., a pH about 7.0 to 8.5 capable of making permanent or semi-permanent metallic lines on black and white surfaces.

17. The writing instrument of claim 2, wherein said instrument is capable of making semi-permanent opaque metallic lines on human skin and nails that are washable with soap and water.

18. A writing instrument, comprising:
a non valve-action body defining an ink reservoir with an opening that is closed off by a fiber nib; and
an ink system in the reservoir, the ink system containing an aluminum pigmented dispersion of not greater particle size than about 12 microns, a sub-micron pigmented colored aqueous dispersion to impart a tint, an anti-settling agent to keep aluminum particles from settling out, and a binder to bind the aluminum pigments together.

19. The writing instrument of claim 18, further including a preservative, a surfactant to reduce surface-tension, and a pH adjuster.

20. A method for forming temporary tattoos on human skin, comprising the step of:
providing a writing instrument which includes a densely packed polyester fiber reservoir and porous polyester oriented fiber nib with channels allowing passage of an ink therethrough, an ink system in the reservoir, the ink system including an aluminum pigment of a particle size that is not greater than about 12 microns, and the fiber nib being in contact with the reservoir and being able to absorb the aluminum pigment by capillary action; and movingly pressing the writing instrument against human skin to create temporary tattoos that are in the form of semi-permanent opaque metallic lines.

21. A writing instrument, comprising:

a densely packed polyester fiber reservoir and a porous polyester oriented fiber nib with channels allowing passage of an ink therethrough;

an ink system in the reservoir, the ink system including a color pigmented dispersion and an aluminum pigment of a particle size that is not greater than about 12 microns;

an anti-settling agent to keep the aluminum particles in suspension; and the fiber nib being in contact with the reservoir and being able to absorb the aluminum pigment by capillary action without a valve-action mechanism.

\* \* \* \* \*